United States Patent Office 3,631,191
Patented Dec. 28, 1971

3,631,191
SYNTHESIS OF ZERO VALENT NICKEL-TETRAKIS TRIARYL PHOSPHITE COMPLEXES
Neal James Kane, Springfield, Pa., and John Brockway Thompson, Wilmington, Del., assignors to E. I. du Pont de Nemours and Company, Wilmington, Del.
No Drawing. Filed Apr. 8, 1970, Ser. No. 26,770
Int. Cl. C07f 15/04
U.S. Cl. 260—439 R
8 Claims

ABSTRACT OF THE DISCLOSURE

The process for preparing a zero valent nickel-phosphite complex by reacting a divalent nickel compound with a reducing metal in the presence of a triaryl phosphite in a saturated aliphatic dinitrile solvent. The reaction mixture separates into multiple phases, one of which contains the desired complex substantially free of by-product and another phase containing the by-product of the reducing action.

BACKGROUND OF THE INVENTION

In the past, tetrakis [triaryl phosphite] nickel (O) complexes have been prepared by reaction of a nickel (O) compound with a triaryl phosphite ligand as described in U.S. Pat. 3,152,158 and U.S. Pat. 3,346,608 or by mixing nickel salts with various metals and the triaryl phosphite as described in Belgian Pat. 621,207. More recently, there has been described a process of reacting a nickel halide with a zinc or cadmium powder in the presence of a triaryl phosphite in 3-pentenenitrile to give a mixture of tetrakis [triaryl phosphite] nickel (O) and either zinc halide or cadmium halide and the use of such a mixture as a catalyst for the hydrocyanation of 3-pentenenitrile. This process is the subject of patent application Ser. No. 729,882, filed May 17, 1968, in the names of M. O. Unger and A. W. Anderson. Such a process offers the advantage that it produces a mixture of the desired catalyst complex and a metal salt which may react as a promoter when the mixture is used for the hydrocyanation of various olefins, in particular, for the hydrocyanation of 3-pentenenitrile.

In some instances it is advantageous to employ a catalyst system free of a promoter such as zinc chloride or other Lewis acids. Accordingly, it is an object of this invention to provide a process for making tetrakis [triaryl phosphite] nickel (O) complexes substantially free of by-product.

SUMMARY OF THE INVENTION

The process of this invention produces tetrakis [triaryl phosphite] nickel (O) substantially free of byproduct. The process involves reacting a divalent nickel compound with a reducing metal in the presence of a triaryl phosphite in a solvent comprising a saturated aliphatic dinitrile, such as adiponitrile or 2-methylglutaronitrile. The reaction mixture is found to separate into multiple phases, one of which contains the desired nickel-phosphite complex substantially free of by-product and another of which contains the by-product formed with the reducing metal. The phase containing the desired complex may be used directly as a catalyst or, particularly if the complex is in the form of a solid, it may be isolated by filtration, decantation, centrifugation or similar technique.

The nickel complexes are of the formula Ni [P(OR)₃]₄ wherein R is an aryl radical having up to 18 carbon atoms. The R groups in a given P(OR)₃ may be the same or different and they may be cojoined.

The desired nickel-phosphite complex may be formed with less than the stoichiometric 4 moles of phosphite per mole of nickel, but at least 4 moles of phosphite should be present in order to insure a good yield of the desired tetrakis complex. The mole ratio of nitrile to nickel may be from 10 to 50 and the reaction temperature may be from 70 to 140° C. Useful triaryl phosphites include triphenyl phosphite, tri-m-cresyl phosphite, tri-p-cresyl phosphite, mixed tri-cresyl phosphites (meta and para) and tri(p-methoxyphenyl)phosphite.

Useful nickel compounds include halide salts such as nickel chloride, nickel bromide and nickel iodide; salts of carboxylic acids such as nickel acetate and nickel propionate; salts of sulfonic acids such as nickel benzenesulfonate or nickel toluenesulfonate; salts of sulfuric acid such as nickel sulfate and compounds such as bis(acetylacetonato) nickel.

Operable reducing metals are those which are more electropositive than nickel in a saturated aliphatic dinitrile containing the aromatic phosphite. That is, they have a greater tendency to give up electrons in this solvent system than does nickel. Useful metals include Na, Li, Mg, Ca, Ba, Sr, Ti, V, Fe, Co, Cu, Zn, Cd, Al, Ga, In, Sn, Pb and Th.

DESCRIPTION OF THE PREFERRED EMBODIMENTS

In the preferred embodiments of this invention, the nickel compound is an anhydrous halide such as the chloride, bromide or iodide. The metal used for reducing the nickel halide from $Ni^{+2}$ to $Ni^0$ is preferably zinc or copper which is present in at least a one molar amount with respect to the nickel. The metal is preferably finely-divided so as to pass through about a 50 mesh size screen. As will be apparent to one skilled in the art, the surface of the metal should be clean, i.e., free of oxygen or other material.

The preferred triaryl phosphites are triphenyl phosphite, tri-p-methoxyphenyl phosphite and mixed tricresyl phosphite. The preferred molar ratio of triaryl phosphite to nickel compound is from 4.0 to 14.0. The preferred molar ratio of nitrile to nickel is in the range of 15 to 20. The preferred saturated aliphatic nitrile is adiponitrile.

It is preferred to form the catalyst complex in an inert atomosphere and at a temperature in the range of about 80 to 120° C. Preferably, the reactants are agitated in order to accelerate the reaction and provide uniformity of product. The reaction may be carried out at atmospheric pressure or at subatmospheric or superatmospheric pressures. In general, pressures of from about 0.7 to 10 atmospheres are preferred because of obvious economic considerations.

The preferred mode of operation of the process is more fully illustrated in the examples to follow.

EXAMPLE I

A three-necked, round bottomed flask fitted with a reflux condenser connected to a "Dry Ice" trap, an inlet tube, and a magnetic stirrer is set up in an oil bath maintained at 110° C. and purged with nitrogen. The flask is charged with 54 grams of NiCl₂, 27.5 grams of 325 mesh zinc dust, 1134 ml. of adiponitrile and 1043 ml. of a freshly distilled reaction product, made by reacting PCl₃ with a mixture comprising predominantly cresols (m- and p-cresols—85%). The reaction mixture is heated for 2 hours with agitation. At this time the agitator is stopped and the reaciton mixture is observed to separate into 2 phases. The upper layer comprises the by-product zinc chloride dissolved in adiponitrile. The desired nickel catalyst complex in excess tricresyl phosphite comprises the lower layer. This is substantially free of by-product zinc chloride, the molar ratio of nickel catalyst/by-product zinc chloride being in the order of 30/1.

To test the catalytic activity of the nickel phosphite complex in hydrocyanation, there is placed in a reaction flask 90 grams of crude 3-pentenenitrile and 12 grams of the catalyst complex of the lower layer of the reaction described above. At this stage the percentage of 3-pentenenitrile in the reaction flask is determined to be 83.4% and the adiponitrile content 2.9% as determined by gas chromatographic analysis. With the reaction flask maintained at 80° C., hydrogen cyanide is fed into the reaction mixture at a rate of about ½ ml. (as measured at 0° C.) of liquid hydrogen cyanide per hour. The reaction is carried on for 1½ hours after which it is stopped and the product analyzed by gas chromatographic analysis. The content of 3-pentenenitrile is found to be 77.9% and the content of adiponitrile is 4.7%.

EXAMPLE II

The use of the catalyst complex described above in the hydrocyanation of butadiene is illustrated in this example.

A 400-ml. stainless steel pressure tube, previously cooled in "Dry Ice," is charged under a nitrogen purge with 27 ml. of hydrogen cyanide, 54 ml. of butadiene, and 7.5 g. of the tetrakis(tri-m and p-cresyl phosphite) nickel (O) catalyst complex described in Example 1. The tube is sealed, cooled in "Dry Ice," and evacuated briefly, then heated to 120° for 8 hours, cooled, and vented. Analysis of the crude product by gas chromatographic analysis shows 18.6% of 2-methyl-3-butenenitrile, 34.6% of trans-3-pentenenitrile and 0.3% of cis-3-pentenenitrile.

The use of the tetrakis(triaryl)phosphite nickel (O) complex prepared in adiponitrile solvent in the isomerization of 2-methyl-3-butenenitrile is illustrated in Examples III and IV.

EXAMPLE III

A quantity of 12.7 grams of the catalyst complex prepared as in Example I and containing 1.69% of nickel, 87.2% of tri(m- and p-cresyl)phosphite, and having a nickel/zinc ratio of 85/1 is added to 13.9 g. of distilled 2-methyl-3-butenenitrile and heated to 110° C. In 22 hours the trans-3-pentenenitrile concentration shows an increase from 2.5% to 8.7% corresponding to a 16.5% conversion of 2-methyl-3-butenenitrile. The yield to trans-3-pentenenitrile is 97.5%.

EXAMPLE IV

The procedure of Example III is repeated except that the reaction mixture is heated at 130° C. In six hours the trans-3-pentenenitrile level shows an increase from 2.4% to 42.1% corresponding to 89.2% conversion of 2-methyl-3-butenenitrile. Total yield to 3- and 4-pentenenitriles is 96.7%.

EXAMPLE V

This example illustrates reduction of the nickel compounds with magnesium.

A 100 ml., three-necked round bottom glass flask fitted with a gas inlet tube, gas exit tube through a reflux condenser, and a thermometer is purged with $N_2$. The flask is charged with 1.3 g. of $NiCl_2$, 18.6 g. of triphenylphosphite, 30 g. of adiponitrile, and 1.0 g. of magnesium metal, and again purged with nitrogen. The mixture is maintained at 120° C. for 5 hours with stirring by a magnetic stirring bar. Heating is then discontinued and stirring is continued for about 12 hours. The desired product which forms as a white solid is recovered by filtration and purified by dissolving in 30 ml. of benzene, filtering, and adding the benzene filtrate to 100 ml. of methanol. The precipitated white solid is recovered by filtration, and dried in vacuum at 25° C. for 12 hours.

EXAMPLE VI

This example illustrates reduction of the nickel compound with thorium.

The procedure of Example 5 is followed except that 2.0 g. of thorium metal powder is used instead of the magnesium. There is obtained 1.2 g. of the desired product in the form of a white powder.

EXAMPLE VII

This example illustrates reduction of the nickel compound with copper. The procedure is the same as that described above for Example V. The flask is charged with 3.1 g. of $NiI_2$, 18.6 g. of $P(OC_6H_5)_3$, 1.0 g. of copper metal powder, and 60 g. of adiponitrile. The mixture is stirred at 25° C. for 21 hours. The product is recovered as described above to give 4.6 g. of white powder.

The catalyst complexes prepared in Examples V, VI, and VII are shown to be active catalysts for hydrocyanation of 3-pentenenitrile as described below.

A 100 ml., three-necked, round bottom glass flask is fitted with a gas inlet tube above liquid level, and a gas exit through a water cooled reflux condenser, and a thermometer. The flask is equipped with a magnetic stirring bar and heated in an oil bath. HCN gas is fed to the reactor by bubbling $N_2$ gas into liquid HCN in a trap maintained at 0° C. and sweeping the resulting gas mixture over the surface of the reaction mixture.

The equipment above is charged with 0.4 g. of the catalyst prepared as described, 0.04 g. of zinc chloride, 0.7 ml. of triphenylphosphite, and 25 ml. of 3-pentenenitrile. The reactor is purged with nitrogen, then heated to 80° C. HCN gas is swept over the surface at the rate of 0.28 ml. per hour measured as liquid HCN for 21 hours. The product is analyzed by gas chromatographic analysis.

With the catalyst complex of Example 5, the reaction mixture contains 32.25% adiponitrile (ADN), 6.62% of 2-methylglutaronitrile (MGN) and 0.84% of ethylsuccinonitrile (ESN). With the complex of Example VI the reaction mixture contains 13.04% ADN, 3.29% MGN and 0.40% of ESN. With the complex of Example VII, the run is made at 100° C. for 14 hours with an HCN feed of 1.3 ml. for 14 hours. The reaction mixture contains 9.98% of ADN, 2.16% of MGN and 0.25% of ESN.

Thus, these catalyst complexes are particularly useful where it is desired to carry out hydrocyanation or isomerization in the absence of a Lewis acid such as $ZnCl_2$. They can also be used where it may be desirable to have a Lewis acid compound and/or an excess of arylphosphite present, such as in hydrocyanation of 3-pentenenitrile. Further, they can be used where it is desired to have present a Lewis acid other than that which would normally be formed as a by-product in the preparation of the complex.

Added advantages of this process over that in which the catalyst is prepared in 3-pentenenitrile are reduced solvent loss by isomerization or disproportionation, reduced loss of arylphosphite ligand in addition to substantial elimination of undesired reaction by-products during catalyst preparation.

We claim:

1. A process for the preparation, substantially free of by-products, of a tetrakis(triorganophosphite)nickel complex of the formula $Ni[P(OR)_3]_4$ wherein R is an aryl group having up to 18 carbon atoms which comprises reacting in a saturated aliphatic dinitrile a divalent nickel compound, a finely-divided reducing metal which is more electropositive than nickel in the saturated aliphatic dinitrile containing a triarylphosphite, and a triarylphopshite wherein the aryl radicals contain up to 18 carbon atoms at a temperature of from 70 to 140° C. to form a multiphase reaction mixture, one phase of which contains the nickel complex and another phase containing by-products of the reaction; removing the by-product containing phase; and recovering the phase containing the nickel complex.

2. The process of claim 1 wherein the reducing metal is selected from the group consisting of zinc and copper.

3. The process of claim 2 wherein the metal is zinc.

4. The process of claim 1 wherein the nickel compound is a nickel halide selected from the group consisting of nickel chloride, nickel bromide and nickel iodide.

5. The process of claim 1 wherein the triarylphosphite is present in an amount of at least 4 moles with respect to the moles of nickel present.

6. The process of claim 1 wherein the triarylphosphite is selected from the class consisting of triphenyl phosphite, tri-p-methoxyphenyl phosphite and mixed tricresyl phosphite.

7. The process of claim 6 wherein the triaryl phosphite is mixed tricresyl phosphite.

8. The process of claim 1 wherein the saturated nitrile is adiponitrile.

References Cited

UNITED STATES PATENTS

| 3,151,155 | 4/1964 | Luttinger | 252—428 |
| 3,496,218 | 2/1970 | Drinkard | 260—465.8 |

FOREIGN PATENTS

| 716,072 | 8/1965 | Canada | 260—439 |

TOBIAS E. LEVOW, Primary Examiner

A. P. DEMERS, Assistant Examiner

U.S. Cl. X.R.

252—431 P; 260—465.3